US012591224B2

(12) United States Patent (10) Patent No.: US 12,591,224 B2
Suginishi et al. (45) Date of Patent: Mar. 31, 2026

(54) CONTROL RULE GENERATING DEVICE, RESULT REFLECTING DEVICE AND CONTROL RULE GENERATING SYSTEM

(71) Applicant: Hitachi, Ltd., Tokyo (JP)

(72) Inventors: Yuuichi Suginishi, Tokyo (JP); Takafumi Chida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 18/134,238

(22) Filed: Apr. 13, 2023

(65) Prior Publication Data

US 2023/0376018 A1    Nov. 23, 2023

(30) Foreign Application Priority Data

May 20, 2022    (JP) ................................. 2022-083307

(51) Int. Cl.
G05B 19/418 (2006.01)
(52) U.S. Cl.
CPC .................. G05B 19/41865 (2013.01); *G05B 2219/32301* (2013.01)
(58) Field of Classification Search
None
See application file for complete search history.

(56) References Cited

U.S. PATENT DOCUMENTS

| 6,303,395 B1 * | 10/2001 | Nulman | G05B 19/4183 |
| | | | 438/14 |
| 7,664,561 B1 * | 2/2010 | Chen | G05B 19/41865 |
| | | | 700/112 |
| 9,033,638 B2 * | 5/2015 | Gifford | B65G 1/12 |
| | | | 414/217 |
| 2004/0067601 A1 * | 4/2004 | Sun | H01L 21/67276 |
| | | | 438/5 |
| 2013/0226547 A1 * | 8/2013 | Norman | G06F 30/20 |
| | | | 703/6 |
| 2019/0228360 A1 * | 7/2019 | Aoyama | G05B 19/41865 |
| 2019/0362283 A1 * | 11/2019 | Saito | G06Q 10/06312 |
| 2020/0151633 A1 * | 5/2020 | Suginishi | G06Q 10/06312 |

FOREIGN PATENT DOCUMENTS

| JP | 2019-168763 A | 10/2019 |
| WO | WO 2021/177311 A1 | 9/2021 |

OTHER PUBLICATIONS

Japanese-language Office Action issued in Japanese Application No. 2022-083307 dated Aug. 5, 2025 with English translation (8 pages).

* cited by examiner

*Primary Examiner* — Jason Lin
(74) *Attorney, Agent, or Firm* — Crowell & Moring LLP

(57) ABSTRACT

To ensure robustness to a production variation. A control rule generating device for generating a control rule of a production facility including at least a production device, includes: a rule storage unit configured to store candidates of a dispatching rule serving as the control rule usable for each of the production facility and a control program for implementing the dispatching rule; and a control rule assigning unit configured to specify, for each of the production facility, the dispatching rule corresponding to a predetermined production plan among the candidates of the dispatching rule as the dispatching rule to be applied, and transmit the control program corresponding to the specified dispatching rule to the production facility.

5 Claims, 13 Drawing Sheets

[FIG. 1]
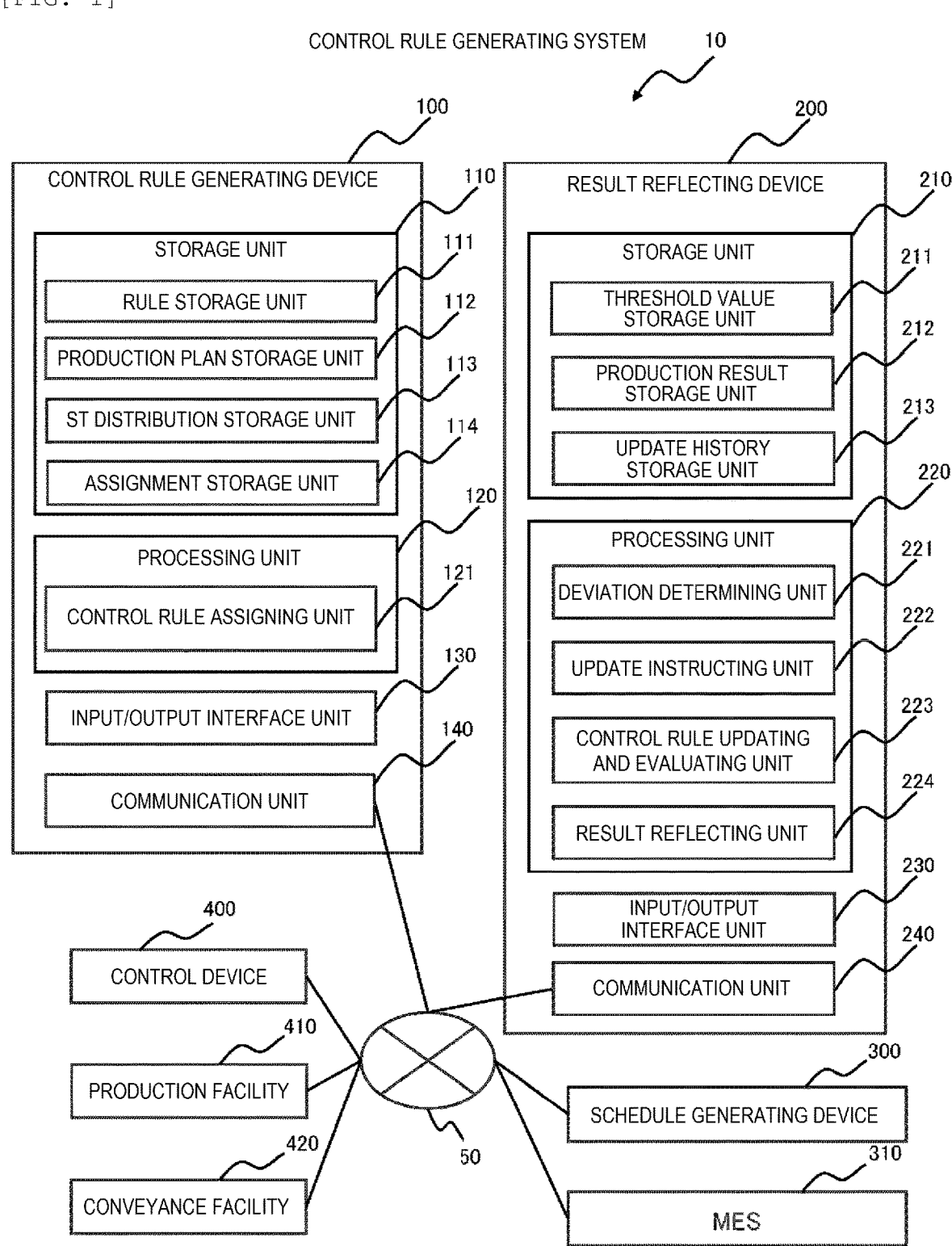

[FIG. 2]
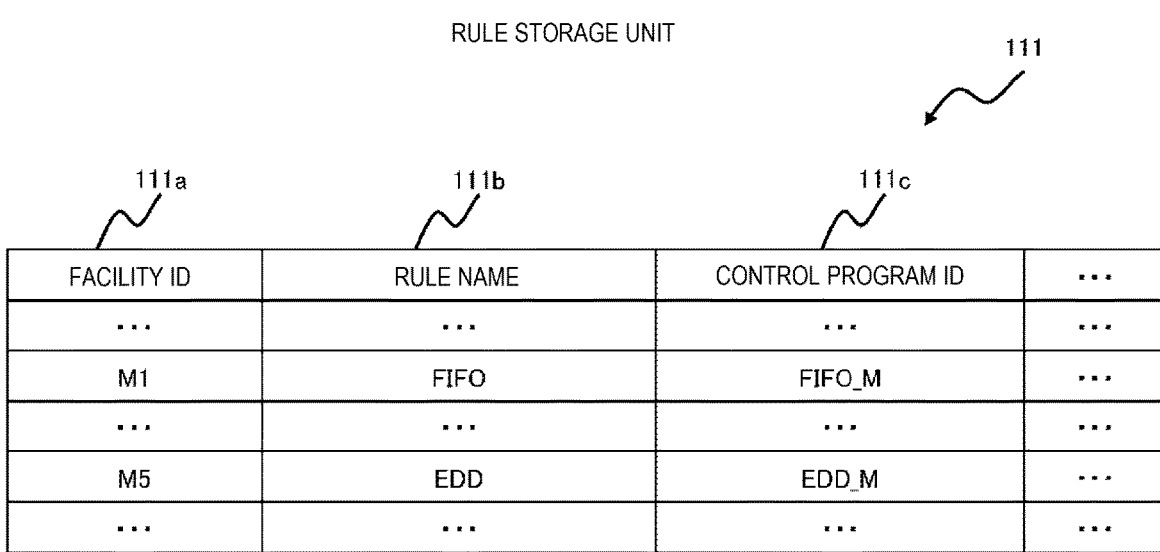
RULE STORAGE UNIT
| FACILITY ID | RULE NAME | CONTROL PROGRAM ID | . . . |
|-------------|-----------|--------------------|-------|
| . . . | . . . | . . . | . . . |
| M1 | FIFO | FIFO_M | . . . |
| . . . | . . . | . . . | . . . |
| M5 | EDD | EDD_M | . . . |
| . . . | . . . | . . . | . . . |

[FIG. 3]
PRODUCTION PLAN STORAGE UNIT
112
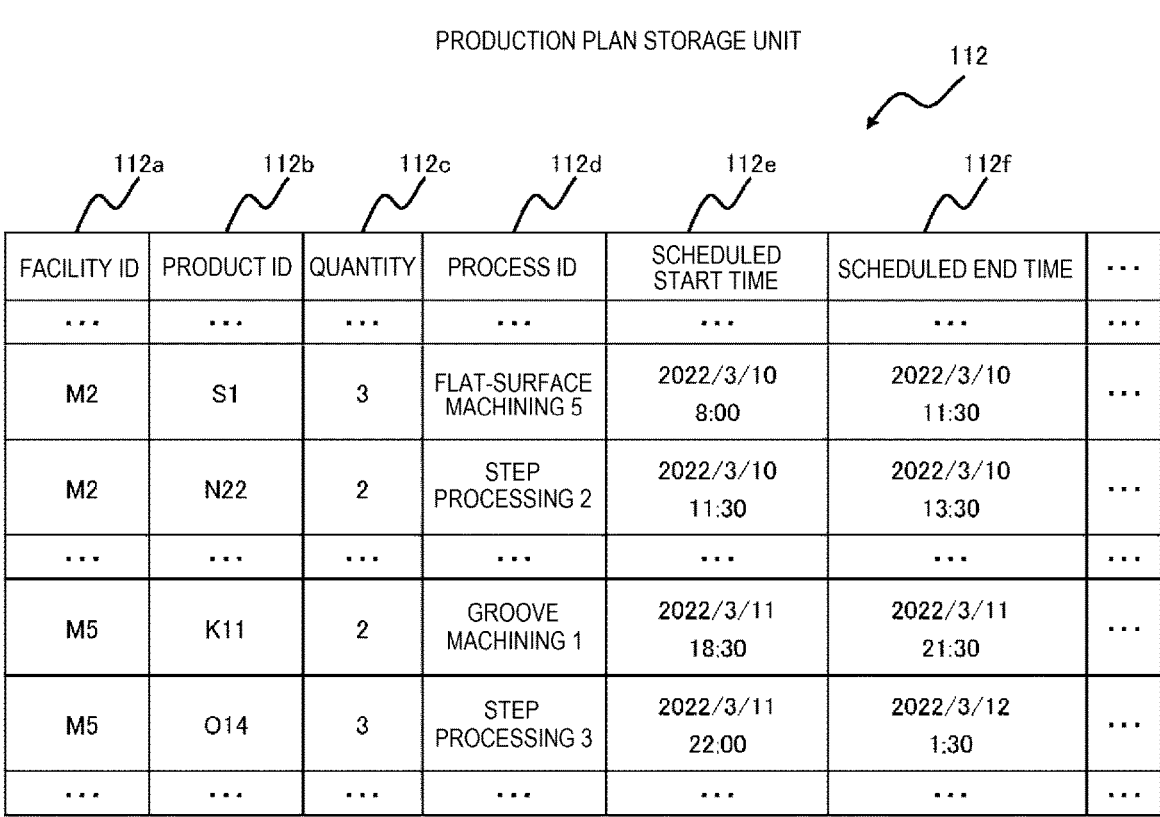
112a    112b    112c    112d    112e    112f
| FACILITY ID | PRODUCT ID | QUANTITY | PROCESS ID | SCHEDULED START TIME | SCHEDULED END TIME | ... |
|---|---|---|---|---|---|---|
| ... | ... | ... | ... | ... | ... | ... |
| M2 | S1 | 3 | FLAT-SURFACE MACHINING 5 | 2022/3/10 8:00 | 2022/3/10 11:30 | ... |
| M2 | N22 | 2 | STEP PROCESSING 2 | 2022/3/10 11:30 | 2022/3/10 13:30 | ... |
| ... | ... | ... | ... | ... | ... | ... |
| M5 | K11 | 2 | GROOVE MACHINING 1 | 2022/3/11 18:30 | 2022/3/11 21:30 | ... |
| M5 | O14 | 3 | STEP PROCESSING 3 | 2022/3/11 22:00 | 2022/3/12 1:30 | ... |
| ... | ... | ... | ... | ... | ... | ... |

[FIG. 4]
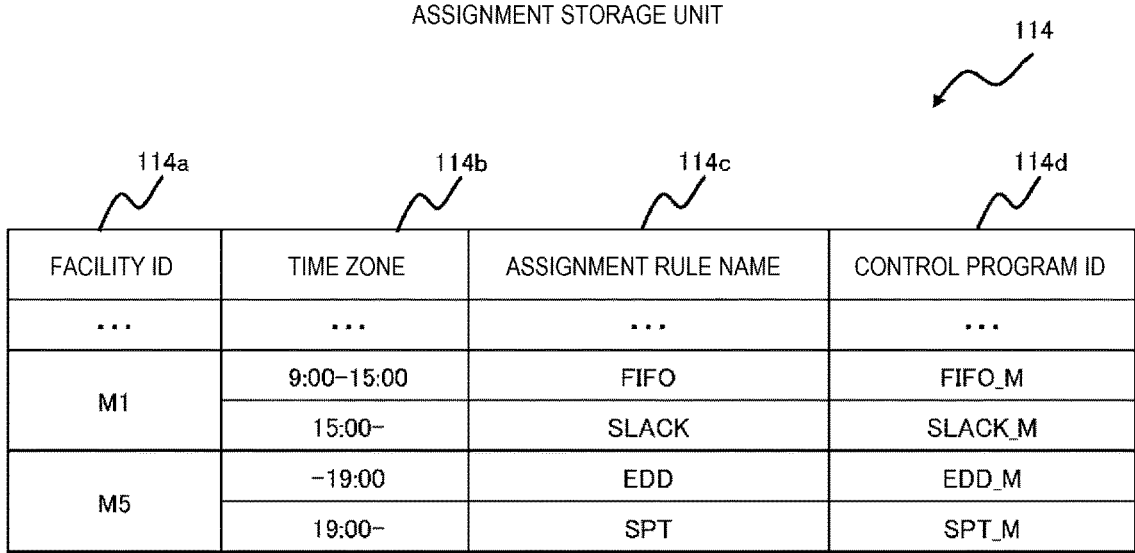
ST DISTRIBUTION STORAGE UNIT                                                          113
| FACILITY ID | PROCESS ID | ST AVERAGE | ST VARIANCE | ... |
|:---:|:---:|:---:|:---:|:---:|
| ... | ... | ... | ... | ... |
| M2 | FLAT-SURFACE MACHINING 5 | 30 | 5 | ... |
| M2 | STEP PROCESSING 2 | 120 | 6 | ... |
| ... | ... | ... | ... | ... |
113a / 113b / 113c / 113d
[FIG. 5]
ASSIGNMENT STORAGE UNIT                                                          114
| FACILITY ID | TIME ZONE | ASSIGNMENT RULE NAME | CONTROL PROGRAM ID |
|:---:|:---:|:---:|:---:|
| ... | ... | ... | ... |
| M1 | 9:00−15:00 | FIFO | FIFO_M |
|  | 15:00− | SLACK | SLACK_M |
| M5 | −19:00 | EDD | EDD_M |
|  | 19:00− | SPT | SPT_M |
114a / 114b / 114c / 114d

[FIG. 6]
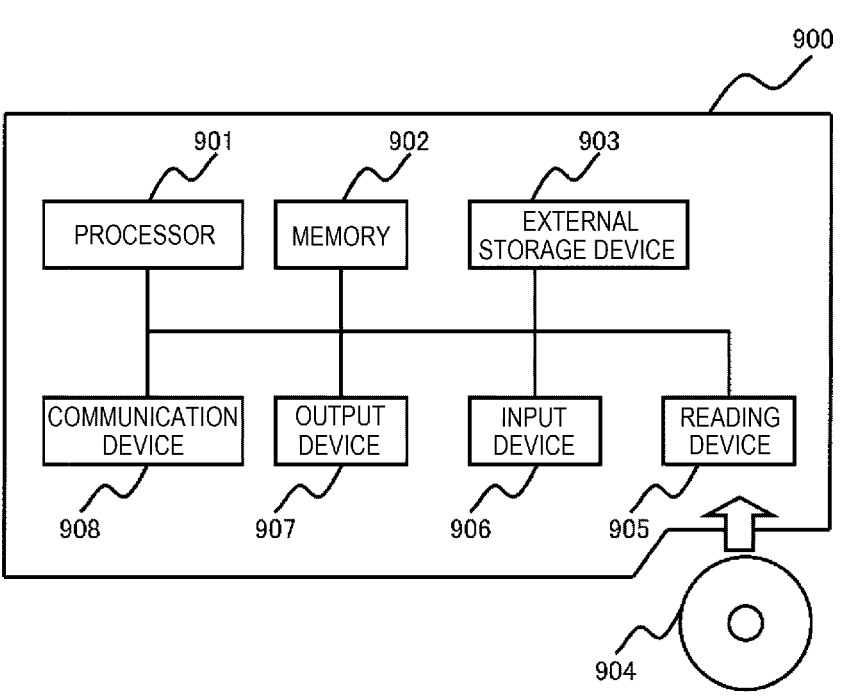

[FIG. 7]
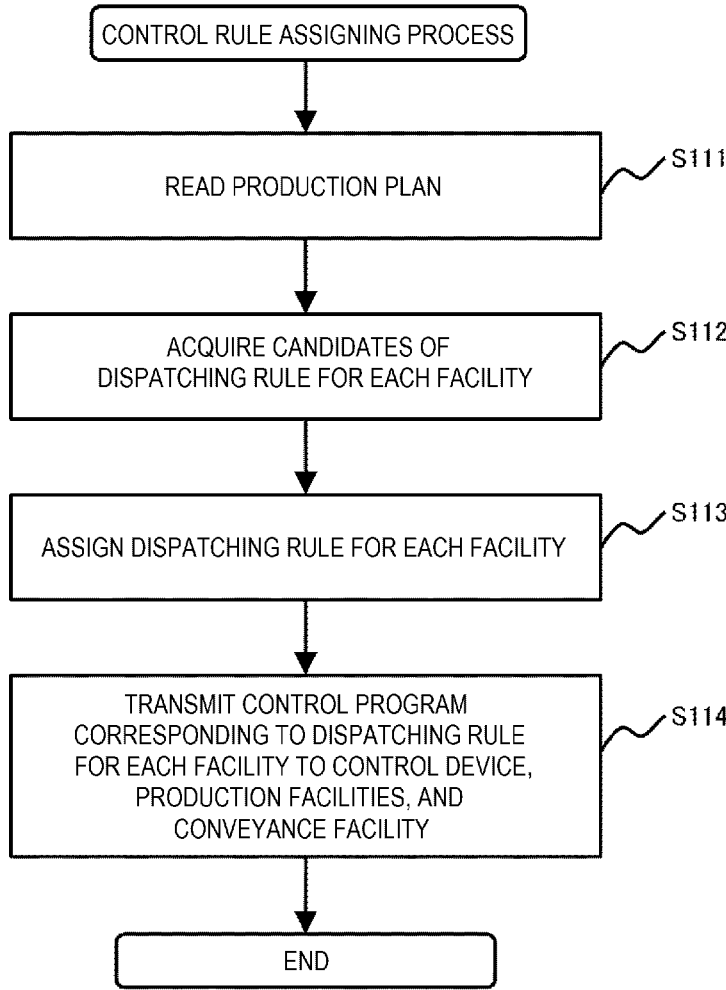

[FIG. 8]

THRESHOLD VALUE STORAGE UNIT                    211

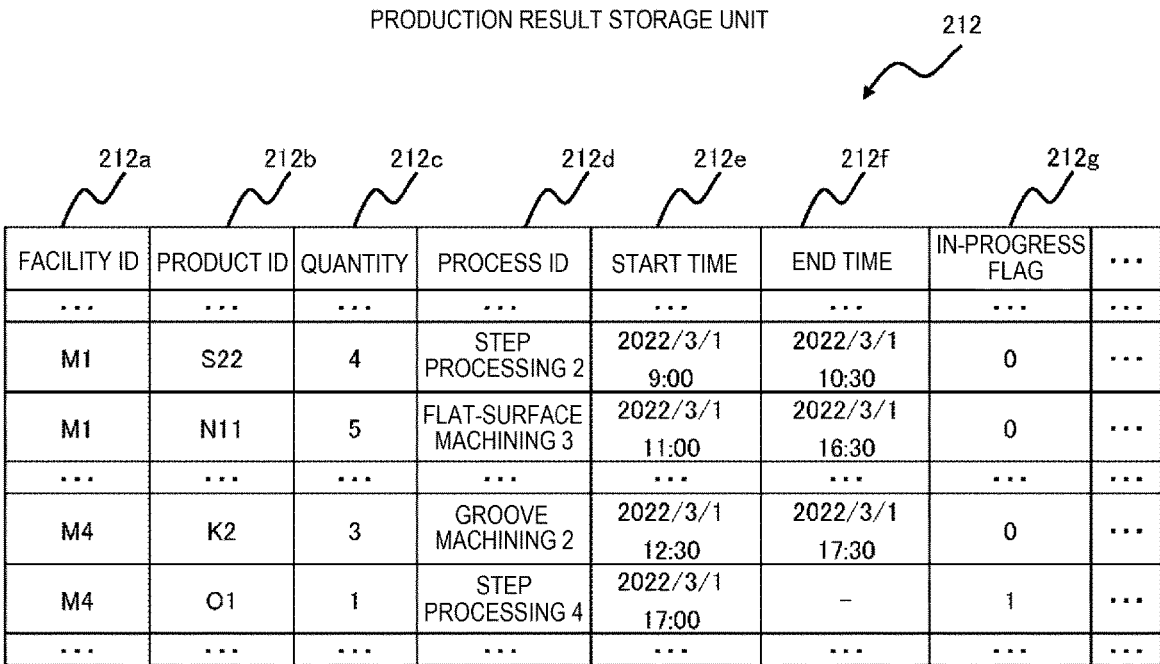

| FACILITY ID | INDEX | CONTROL CHANGE THRESHOLD VALUE | PLAN CHANGE THRESHOLD VALUE | ... |
|---|---|---|---|---|
| ... | ... | ... | ... | ... |
| M1 | PLAN COMPLIANCE RATE | 0.1 | 0.2 | ... |
| M2 | PLAN ORDER MATCHING RATE | 0.05 | 0.1 | ... |
| ... | ... | ... | ... | ... |

PRODUCTION RESULT STORAGE UNIT                    212

| FACILITY ID | PRODUCT ID | QUANTITY | PROCESS ID | START TIME | END TIME | IN-PROGRESS FLAG | ... |
|---|---|---|---|---|---|---|---|
| ... | ... | ... | ... | ... | ... | ... | ... |
| M1 | S22 | 4 | STEP PROCESSING 2 | 2022/3/1 9:00 | 2022/3/1 10:30 | 0 | ... |
| M1 | N11 | 5 | FLAT-SURFACE MACHINING 3 | 2022/3/1 11:00 | 2022/3/1 16:30 | 0 | ... |
| ... | ... | ... | ... | ... | ... | ... | ... |
| M4 | K2 | 3 | GROOVE MACHINING 2 | 2022/3/1 12:30 | 2022/3/1 17:30 | 0 | ... |
| M4 | O1 | 1 | STEP PROCESSING 4 | 2022/3/1 17:00 | – | 1 | ... |
| ... | ... | ... | ... | ... | ... | ... | ... |

212a  212b  212c  212d  212e  212f  212g

[FIG. 10]
UPDATE HISTORY STORAGE UNIT                     213
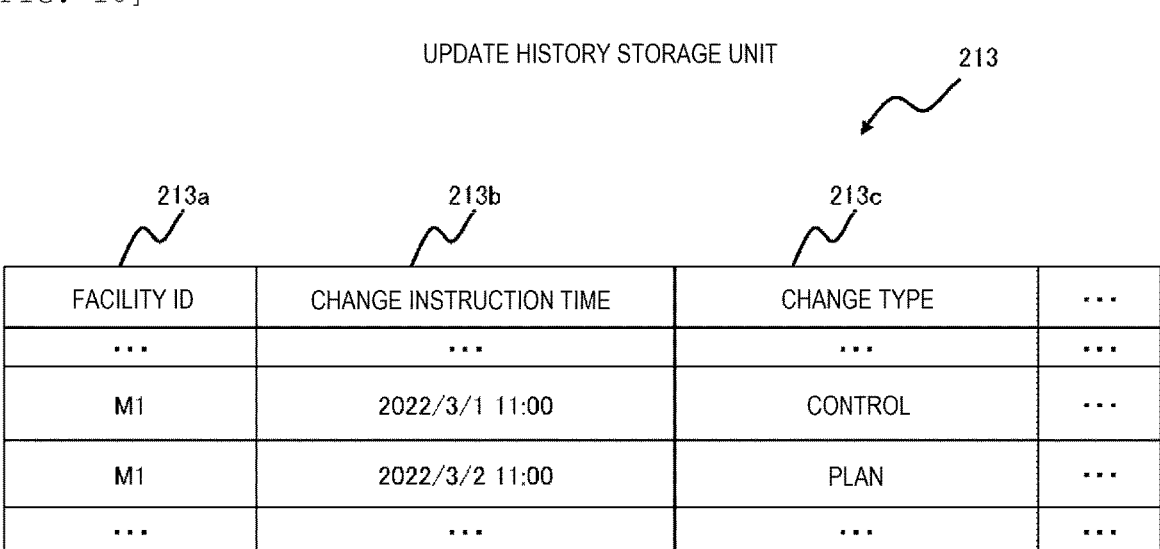
| FACILITY ID | CHANGE INSTRUCTION TIME | CHANGE TYPE | . . . |
|---|---|---|---|
| . . . | . . . | . . . | . . . |
| M1 | 2022/3/1 11:00 | CONTROL | . . . |
| M1 | 2022/3/2 11:00 | PLAN | . . . |
| . . . | . . . | . . . | . . . |

[FIG. 11]
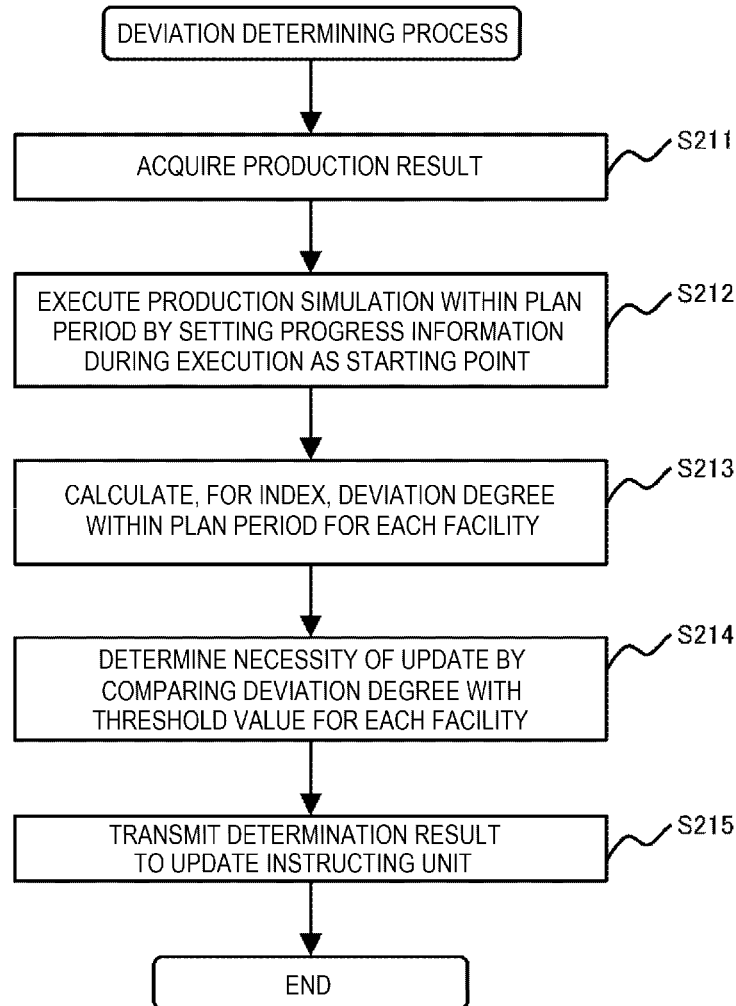

[FIG. 12]
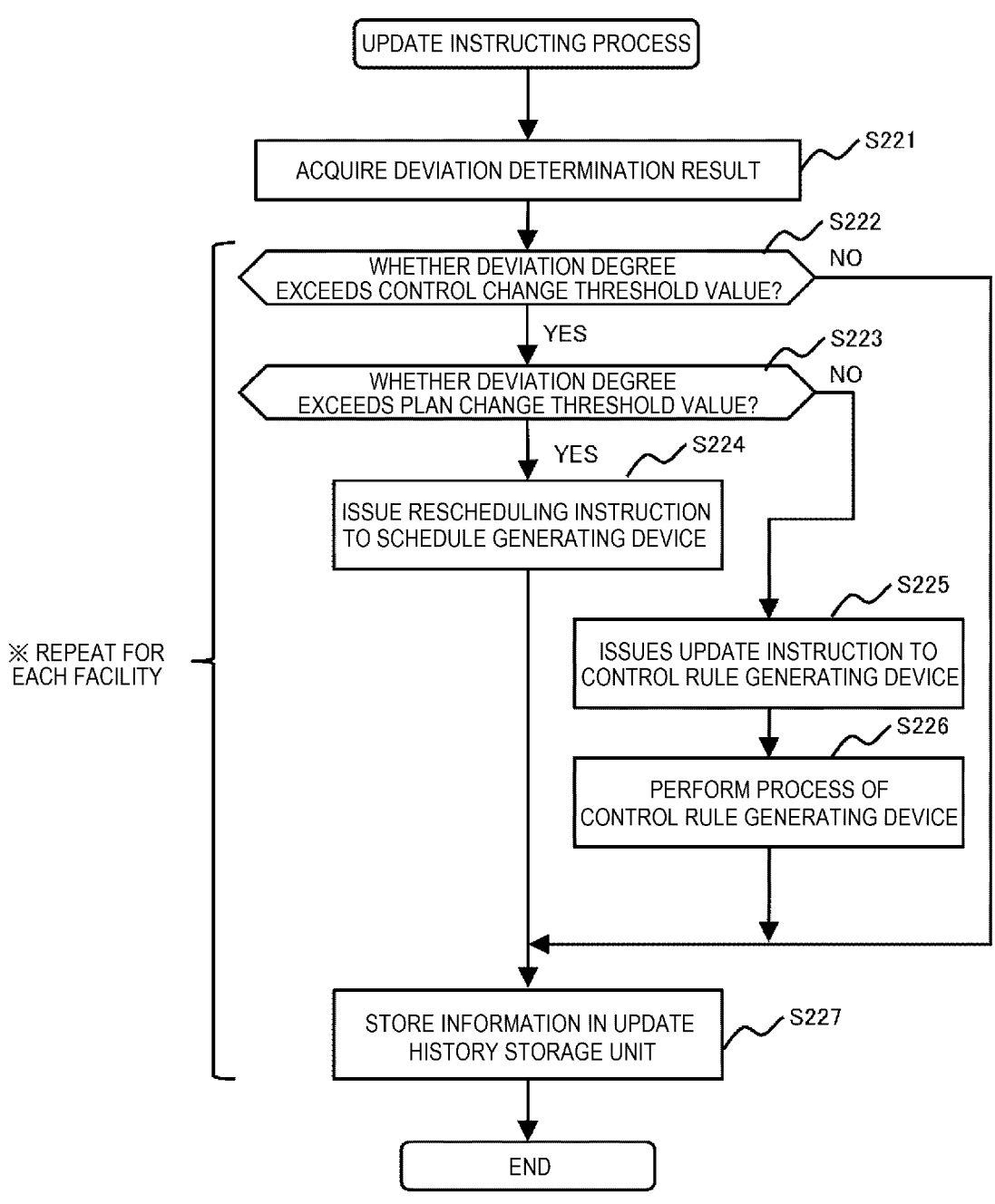

[FIG. 13]
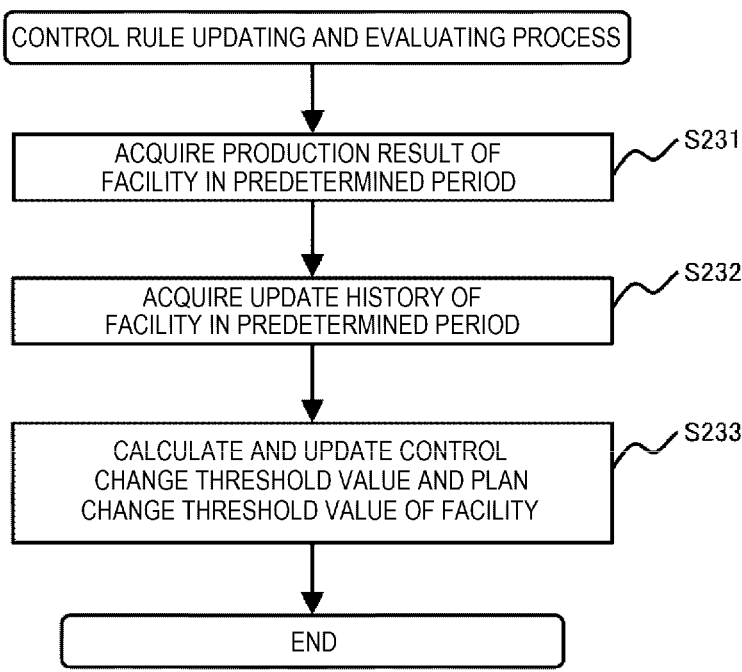

[FIG. 14]
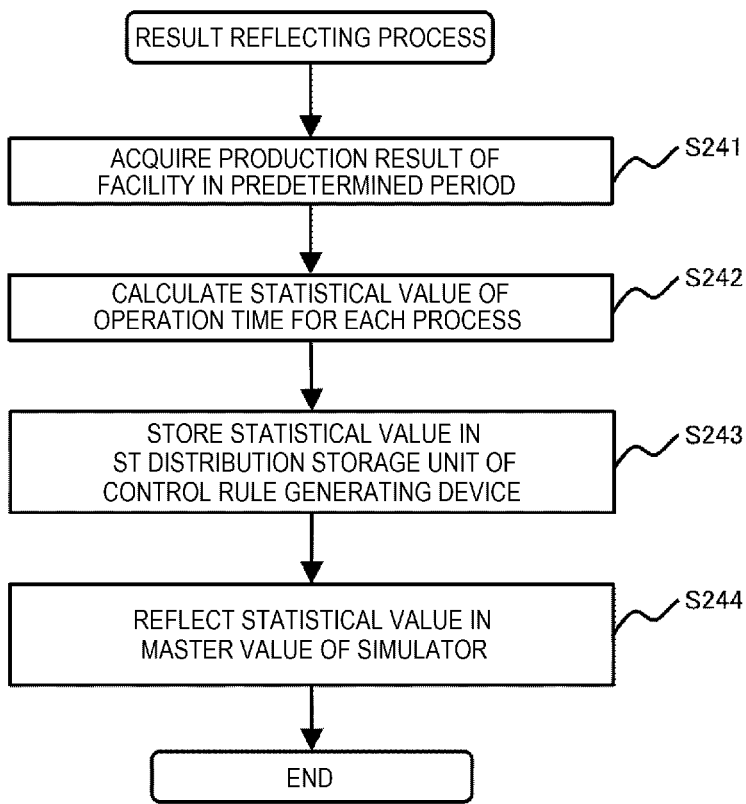

[FIG. 15]
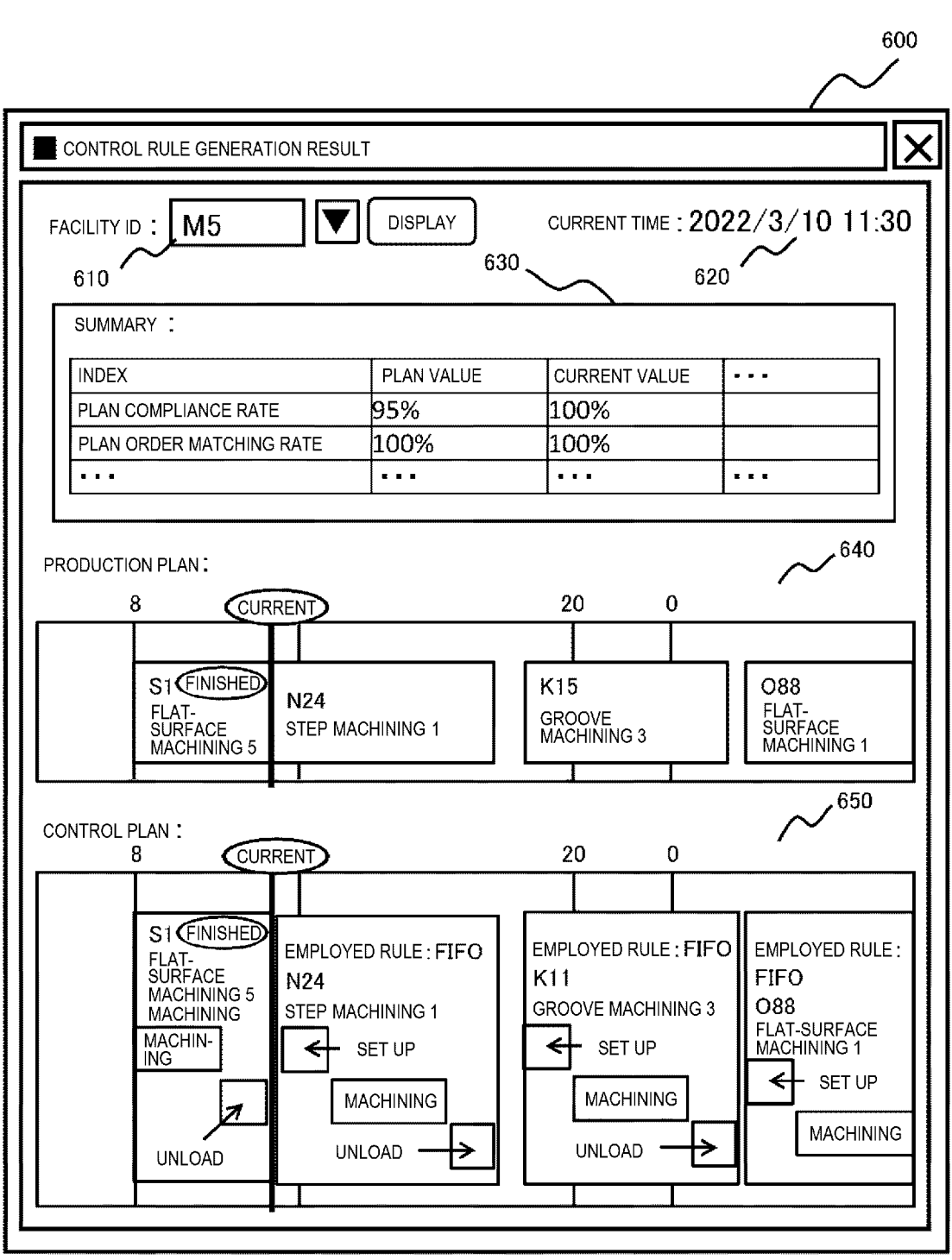

CONTROL RULE GENERATING DEVICE, RESULT REFLECTING DEVICE AND CONTROL RULE GENERATING SYSTEM

TECHNICAL FIELD

The present invention relates to a control rule generating device, a result reflecting device, and a control rule generating system.

BACKGROUND ART

In recent years, there is a tendency that not only a company but also a business entity is required to achieve improvement in both resilience and management efficiency. In this regard, one solution is to construct an open supply chain from the perspective of customers.

Further, the supply chain provides a system or an apparatus serving as a basis for constructing a supply chain in which at least two or more business entities participate from material procurement to sales of articles, from the perspective of a computer system. It is assumed that in a supply chain system, a business entity (also referred to as a supplier) participating therein dynamically performs manufacture of components of multiple items and articles to be supplied.

In such a supply chain, it is important for a supplier to flexibly set a production plan and to rapidly perform production. In particular, it is important to reflect the production plan in a specific control rule of a production facility in a manner of not impairing production efficiency, and to rapidly control a specific operation of the production facility. Specifically, it is known that a flexible line or a job shop line requires a rapid change of a control rule in order to reduce an influence on a production variation such as a delay.

PTL 1 describes a technique of dividing a production plan into events, classifying the events according to necessity of set-up change, and setting a start time for each classification to generate an operation plan.

CITATION LIST

Patent Literature

PTL 1: JP2019-168763A

SUMMARY OF INVENTION

Technical Problem

In the technique described in PTL 1 described above, when a delay occurs, although the events included in the operation plan are slightly changed in order, an operation plan in which the events are postponed is generated according to a fixed rule. Therefore, in a production site represented by a job shop, it is not possible to prevent a decrease in production efficiency even when the operation plan is reviewed. This is because an influence due to the delay propagates and affects a plurality of production facilities in charge of downstream processes and a progress of a product to be processed by the production facilities.

An object of the invention is to ensure robustness to a production variation.

Solution to Problem

In order to solve the above problem, the present application employs, for example, means described in the claims.

The invention includes a plurality of means for solving the above problem, and a control rule generating device for generating a control rule of a production facility including at least a production device is provided as an example. The control rule generating device includes a rule storage unit configured to store candidates of a dispatching rule serving as the control rule usable for each of the production facility and a control program for implementing the dispatching rule; and a control rule assigning unit configured to specify, for each of the production facility, the dispatching rule corresponding to a predetermined production plan among the candidates of the dispatching rule as the dispatching rule to be applied, and transmit the control program corresponding to the specified dispatching rule to the production facility.

Advantageous Effects of Invention

According to the invention, it is possible to provide a technique for ensuring robustness to a production variation.

Problems, configurations, and effects other than those described above will be clarified by the following description of embodiments.

BRIEF DESCRIPTION OF DRAWINGS

FIG. 1 is a diagram illustrating a configuration example of a control rule generating system.

FIG. 2 is a diagram illustrating an example of a data structure of a rule storage unit.

FIG. 3 is a diagram illustrating an example of a data structure of a production plan storage unit.

FIG. 4 is a diagram illustrating an example of a data structure of an ST distribution storage unit.

FIG. 5 is a diagram illustrating an example of a data structure of an assignment storage unit.

FIG. 6 is a diagram illustrating an example of a hardware configuration of a control rule generating device.

FIG. 7 is a diagram illustrating an example of a flowchart of a control rule assigning process.

FIG. 8 is a diagram illustrating an example of a data structure of a threshold value storage unit.

FIG. 9 is a diagram illustrating an example of a data structure of a production result storage unit.

FIG. 10 is a diagram illustrating an example of a data structure of an update history storage unit.

FIG. 11 is a diagram illustrating an example of a flowchart of a deviation determining process.

FIG. 12 is a diagram illustrating an example of a flowchart of an update instructing process.

FIG. 13 is a diagram illustrating an example of a flowchart of a control rule updating and evaluating process.

FIG. 14 is a diagram illustrating an example of a flowchart of a result reflecting process.

FIG. 15 is a diagram illustrating an example of a control rule generation result screen.

DESCRIPTION OF EMBODIMENTS

In the following embodiments, description may be divided into a plurality of aspects or embodiments if necessary for convenience. Unless particularly specified, the aspects or embodiments are not independent of each other, but have a relation in which one aspect or embodiment is a modification, detailed description, supplementary description, or the like of a part or all of another aspect or embodiment.

In the following embodiments, when a number and the like (including the number, a numeric value, an amount, a range, and the like) of an element is referred to, the number and the like is not limited to a specific number, and the value may be equal to or greater than or equal to or less than a specific number, unless explicitly and particularly specified or unless the number and the like is clearly limited to a specific number in principle.

Further, in the following embodiments, it is needless to say that elements (including element steps and the like) are not always indispensable unless explicitly and particularly specified or unless the elements are clearly considered essential in principle.

Similarly, in the following embodiments, when a reference is made to shapes, positional relations, and the like of the elements or the like, the elements or the like include those substantially approximate or similar to the shapes or the like unless explicitly and particularly specified or unless the elements or the like are clearly considered to be not the case in principle. The same applies to the numerical value and the range.

In addition, in all the drawings illustrating the embodiments, the same members are denoted by the same reference signs in principle, and repetitive descriptions thereof will be omitted. However, even in a case of the same member, when it is highly probable to cause confusion if a name is shared by members before and after a change due to an environmental change or the like, another different reference sign or name may be given.

In the following embodiments, an "input/output interface unit" may be one or more interface devices. The one or more interface devices may be at least one of the following.

One or more input/output (I/O) interface devices. The I/O interface device is an interface device for at least one of an I/O device and a remote display computer. The I/O interface device for the display computer may be a communication interface device. At least one I/O device may be a user interface device, for example, any one of an input device such as a keyboard and a pointing device; and an output device such as a display device.

One or more communication interface devices. The one or more communication interface devices may be one or more communication interface devices of the same type (for example, one or more network interface cards (NIC)), or may be two or more communication interface devices of different types (for example, an NIC and a host bus adapter (HBA)).

In addition, in the following description, a "memory" may be one or more memory devices as an example of one or more storage devices, and may typically be a main storage device. At least one memory device in the memory may be a volatile memory device or a non-volatile memory device.

In the following description, a "persistent storage device" may be one or more persistent storage devices as an example of one or more storage devices. Typically, the persistent storage device may be a non-volatile storage device (for example, an auxiliary storage device), and may specifically be, for example, a hard disk drive (HDD), a solid state drive (SSD), a non-volatile memory express (NVME) drive, or a storage class memory (SCM).

In addition, in the following description, a "storage unit" or a "storage device" may be the memory or both the memory and the persistent storage device.

Further, in the following description, a "processing unit" or a "processor" may be one or more processor devices. Typically, at least one processor device may be a microprocessor device such as a central processing unit (CPU). Alternatively, the processor device may also be another type of processor device such as a graphics processing unit (GPU). The at least one processor device may be a single-core processor device or a multi-core processor device. The at least one processor device may be a processor core. The at least one processor device may be a processor device in a broad sense, such as a circuit (for example, a field-programmable gate array (FPGA), a complex programmable logic device (CPLD), or an application specific integrated circuit (ASIC)) which is a collection of gate arrays in a hardware description language that performs a part or all of a process.

In addition, in the following description, an expression of "yyy unit" may be used to describe a function, and the function may be implemented by a processor executing one or more computer programs, or may be implemented by one or more hardware circuits (for example, an FPGA or an ASIC), or may be implemented by a combination of the above implementation methods. When the function is implemented by the processor executing the program, since a predetermined process is executed by appropriately using a storage device and/or an interface device, the function may be at least a part of the processor. A process described using a function as a subject may be a process performed by a processor or by a device including the processor. The program may be installed from a program source. The program source may be, for example, a recording medium (for example, a non-transitory recording medium) readable by a program distribution computer or a computer. A description for each function is an example, and a plurality of functions may be combined into one function, or one function may be divided into a plurality of functions.

In the following description, a process may be described using a "program" or a "processing unit" as a subject, and a process described using a program as a subject may be a process performed by a processor or by a device including the processor. Two or more programs may be implemented as one program, and one program may be implemented as two or more programs.

In the following description, an expression such as "xxx table" may be used to describe information that is acquired as an output for an input, and the information may be a table of any structure, or may be a learning model such as a neural network that generates an output for an input, a genetic algorithm, and a random forest. Therefore, the "xxx table" can be referred to as "xxx information". In the following description, a configuration of each table is an example, one table may be divided into two or more tables, and all or a part of the two or more tables may be one table.

In addition, in the following description, a "control rule generating device" and a "result reflecting device" may be systems including one or more physical computers or may be systems (for example, a cloud computing system) each implemented on a physical calculation resource group (for example, a cloud infrastructure). "Displaying" display information by a control rule generating device 100 may be displaying the display information on a display device in a computer, or may be transmitting the display information from the computer to a display computer. In the latter case, the display information is displayed by the display computer. Hereinafter, each embodiment of the invention will be described with reference to the drawings.

FIG. 1 is a diagram illustrating a configuration example of a control rule generating system. A control rule generating system 10 includes the control rule generating device 100, a result reflecting device 200, a schedule generating device 300, a manufacturing execution system (MES) 310, a control device 400, production facilities 410, a conveyance facility 420, and a network 50 that communicably connects these components with one another.

The network 50 is, for example, any one of a communication network using a part or all of general public lines such as a local area network (LAN), a wide area network (WAN), a virtual private network (VPN), and the Internet; and a mobile phone communication network and the like, or may be a combination of the communication network and the mobile phone communication network and the like. The network may be a wireless communication network such as Wi-Fi (registered trademark) or 5G (Generation).

The control rule generating device 100 includes a storage unit 110, a processing unit 120, an input/output interface unit 130, and a communication unit 140. The storage unit 110 includes a rule storage unit 111, a production plan storage unit 112, an ST distribution storage unit 113, and an assignment storage unit 114. The processing unit 120 includes a control rule assigning unit 121.

FIG. 2 is a diagram illustrating an example of a data structure of the rule storage unit. The rule storage unit 111 stores candidates of a dispatching rule as a control rule usable for each production facility 410 including at least a production device and each conveyance facility 420, and a control program for implementing the dispatching rules. Specifically, the rule storage unit 111 includes a facility ID column 111a, a rule name column 111b, and a control program ID column 111c. The facility ID column 111a, the rule name column 111b, and the control program ID column 111c are associated with one another.

In the facility ID column 111a, information for specifying a facility ID that is identification information for uniquely identifying the production facility 410 or a production resource in a production area, and the conveyance facility 420 or a conveyance resource in the production area is stored.

In the rule name column 111b, a rule name of the dispatching rule useable in the production facility 410 and the conveyance facility 420 that are specified by the facility ID column 111a is stored. The dispatching rule is a rule for determining an order of processes for a product in progress. The dispatching rule is, for example, an existing rule such as first in first out (FIFO), earliest due date (EDD), SLACK, shortest processing time (SPT), and the like.

In the control program ID column 111c, information for specifying a control program that implements the dispatching rule specified by the rule name column 111b is stored.

FIG. 3 is a diagram illustrating an example of a data structure of the production plan storage unit. The production plan storage unit 112 stores information acquired from the schedule generating device 300. The production plan storage unit 112 includes a facility ID column 112a, a product ID column 112b, a quantity column 112c, a process ID column 112d, a scheduled start time column 112e, and a scheduled end time column 112f.

The facility ID column 112a, the product ID column 112b, the quantity column 112c, the process ID column 112d, the scheduled start time column 112e, and the scheduled end time column 112f are associated with one another.

In the facility ID column 112a, information for specifying a facility ID that is identification information for uniquely identifying the production facility 410 or the production resource in the production area, and the conveyance facility 420 or the conveyance resource in the production area is stored.

In the product ID column 112b, a product ID for specifying a product is stored. The product ID is information for uniquely identifying a product such as an article or a component to be produced or conveyed by the production facility 410 or the conveyance facility 420 that is specified by the facility ID column 112a.

In the quantity column 112c, information for specifying the quantity of a product specified by the product ID column 112b is stored.

In the process ID column 112d, a process ID for specifying a process is stored. The process ID is information for uniquely identifying a process of processing a product specified by the product ID column 112b in the production facility 410 and the conveyance facility 420 that are specified by the facility ID column 112a.

In the scheduled start time column 112e, information for specifying a scheduled time when processing of a process specified by the process ID column 112d is started is stored. The process is a process that is performed in the production facility 410 specified by the facility ID column 112a for a product specified by the product ID column 112b.

In the scheduled end time column 112f, information for specifying a scheduled time when processing of a process specified by the process ID column 112d is completed is stored. The process is a process that is performed in the production facility 410 specified by the facility ID column 112a for a product specified by the product ID column 112b.

FIG. 4 is a diagram illustrating an example of a data structure of the ST distribution storage unit. The ST distribution storage unit 113 stores information acquired from the result reflecting device 200. The ST distribution storage unit 113 includes a facility ID column 113a, a process ID column 113b, an ST average column 113c, and an ST variance column 113d.

The facility ID column 113a, the process ID column 113b, the ST average column 113c, and the ST variance column 113d are associated with one another.

In the facility ID column 113a, information for specifying a facility ID that is identification information for uniquely identifying the production facility 410 or the production resource in the production area, and the conveyance facility 420 or the conveyance resource of the production area is stored.

In the process ID column 113b, a process ID for specifying a process is stored. The process ID is information for uniquely identifying a process performed by the production facility 410 and the conveyance facility 420 that are specified by the facility ID column 113a.

In the ST average column 113c, an average value of a standard time (ST) related to processing in a process is stored. This process is a process specified by the process ID column 113b and performed in the production facility 410 specified by the facility ID column 113a.

In the ST variance column 113d, a variance value of an ST related to processing in a process is stored. This process is a process specified by the process ID column 113b and performed in the production facility 410 specified by the facility ID column 113a.

Further, as an example of the ST distribution storage unit 113, an example is shown in which representative values (average and variance) obtained by assuming a normal distribution as a distribution of the ST are stored. Alternatively, in a case of another distribution, representative values of the distribution may be stored.

FIG. 5 is a diagram illustrating an example of a data structure of the assignment storage unit. The assignment storage unit 114 stores a facility ID column 114a, a time zone column 114*b*, an assignment rule name column 114*c*, and a control program ID column 114*d*. The facility ID column 114*a*, the time zone column 114*b*, the assignment rule name column 114*c*, and the control program ID column 114*d* are associated with one another.

In the facility ID column 114*a*, information for specifying a facility ID that is identification information for uniquely identifying the production facility 410 or the production resource in the production area, and the conveyance facility 420 or the conveyance resource in the production area is stored.

In the time zone column 114*b*, information indicating a predetermined period in a day is stored. For example, the predetermined period is "9:00-15:00" or the like. This time zone is a time zone during which a dispatching rule specified by the assignment rule name column 114*c* is applied in the production facility 410 and the conveyance facility 420 that are specified by the facility ID column 114*a*.

In the assignment rule name column 114*c*, a rule name of a dispatching rule assigned to the production facility 410 and the conveyance facility 420 that are specified by the facility ID column 114*a* is stored.

In the control program ID column 114*d*, information for specifying a control program that implements a dispatching rule specified by the assignment rule name column 114*c* is stored.

The description returns to FIG. 1. The control rule assigning unit 121 of the processing unit 120 specifies, for each production facility 410 or each conveyance facility 420, a dispatching rule corresponding to a predetermined production plan among the candidates of the dispatching rule as a dispatching rule to be applied. Then, the control rule assigning unit 121 transmits a control program corresponding to the specified dispatching rule to the production facility 410 or the conveyance facility 420.

In addition, in a specifying process of the dispatching rule, the control rule assigning unit 121 estimates an operation time of a production process included in a production plan by using a statistical error, and specifies a dispatching rule by using a compliance rate of the production plan (robust optimization). Alternatively, in the specifying process of the dispatching rule, the control rule assigning unit 121 performs a simulation to which a dispatching rule is applied for each time zone, and specifies the dispatching rule by using a compliance rate of a production plan.

In the specifying process of the dispatching rule, the control rule assigning unit 121 can determine a dispatching rule by, for example, investigating all combinations of rules that can be adopted for each production facility 410 or each conveyance facility 420, and obtaining an index. Alternatively, the control rule assigning unit 121 can efficiently obtain an optimum dispatching rule for each facility by searching using genetic programming.

The input/output interface unit 130 receives input of various types of data. Specifically, the input/output interface unit 130 receives an input of information stored in the production plan storage unit 112 from a user.

The communication unit 140 communicates with other devices via the network 50. The other devices include the result reflecting device 200, the schedule generating device 300, the MES 310, the control device 400, the production facilities 410, and the conveyance facility 420.

FIG. 6 is a diagram illustrating an example of a hardware configuration of the control rule generating device. The control rule generating device 100 can be implemented by a general-purpose computer 900 that includes a processor (for example, a central processing unit (CPU) or a graphic processing unit (GPU)) 901, a memory 902 such as a random access memory (RAM), an external storage device 903 such as a hard disk drive (HDD) or a solid state drive (SSD), a reading device 905 that reads information from a portable storage medium 904 such as a compact disk (CD) or a digital versatile disk (DVD), an input device 906 such as a keyboard, a mouse, a barcode reader, or a touch panel, an output device 907 such as a display, and a communication device 908 that communicates with other computers via a communication network such as a LAN or the Internet, or the control rule generating device 100 can be implemented by a network system that includes a plurality of computers 900. The reading device 905 may be capable of not only reading but also writing the portable storage medium 904.

The processor 901 executes various processes by executing a predetermined control rule generating program loaded from the external storage device 903 to the memory 902. The control rule generating program is, for example, an application program that is executable on an operating system (OS) program. For example, the control rule generating program may be installed in the external storage device 903 from the portable storage medium 904 via the reading device 905, or may be downloaded from the network via the communication device 908 and executed by the processor 901.

For example, the control rule assigning unit 121 can be implemented by loading the control rule generating program stored in the external storage device 903 into the memory 902 and executing the control rule generating program by the processor 901. The input/output interface unit 130 can be implemented by the processor 901 using the input device 906, the output device 907, and the communication device 908. The storage unit 110 can be implemented by the processor 901 using the memory 902 or the external storage device 903. The communication unit 140 can be implemented by the processor 901 using the communication device 908.

FIG. 7 is a diagram illustrating an example of a flowchart of a control rule assigning process. The control rule assigning process is started when a start instruction is received from a user or the like. Alternatively, the control rule assigning process may be started at a predetermined date and time (for example, 6:00 a.m. every day) or at a predetermined interval (for example, every 12 hours).

First, the control rule assigning unit 121 reads a production plan (step S111). Specifically, the control rule assigning unit 121 reads a production plan stored in the production plan storage unit 112.

Then, the control rule assigning unit 121 acquires candidates of the dispatching rule for each facility (step S112). Specifically, the control rule assigning unit 121 reads, from the rule storage unit 111, candidates of the dispatching rule for each production facility 410 and each conveyance facility 420.

Then, the control rule assigning unit 121 assigns a dispatching rule for each facility (step S113). Specifically, the control rule assigning unit 121 determines, for each production facility 410 and each conveyance facility, the dispatching rule in which the production plan is reproduced best. For example, the control rule assigning unit 121 uses a simulator, and uses an index representing a matching degree between a simulation result and a production plan stored in the production plan storage unit 112 to determine a dispatching rule for each facility such that the matching degree is maximized. The control rule assigning unit 121 stores an assigned result in the assignment storage unit 114.

Here, the control rule assigning unit 121 uses, as the simulator, a discrete event type simulator that simulates operations of the control device 400, the production facilities 410, and the conveyance facility 420. An index representing the matching degree can be set to, for example, a plan compliance rate=Σ_(all facilities) (the number of work procedures complying with a scheduled completion time in the production plan of one facility)/(the total number of work procedures of the facility). Alternatively, for example, the index can be set to a plan order matching rate=Σ_(all facilities) (the number of work procedures matching with a work procedure order in the production plan of one facility)/(the total number of work procedures of the facility). In addition, a weighted sum of the plan compliance rate and the plan order matching rate may be used as the index.

Then, the control rule assigning unit 121 transmits a control program corresponding to the dispatching rule for each facility to the control device 400, the production facilities 410, and the conveyance facility 420 (step S114). Specifically, the control rule assigning unit 121 refers to the assignment storage unit 114 to specify a control program corresponding to the dispatching rule assigned to each facility, and transmits the control program to the control device 400, the production facilities 410, and the conveyance facility 420.

A flow of the control rule assigning process has been described above. According to the control rule assigning process, when a delay occurs, it is possible to change a processing order between the processes and a processing order in a process, and thus it is possible to ensure the robustness to the production variation.

The description returns to FIG. 1. The result reflecting device 200 includes a storage unit 210, a processing unit 220, an input/output interface unit 230, and a communication unit 240. The storage unit 210 includes a threshold value storage unit 211, a production result storage unit 212, and an update history storage unit 213. The processing unit 220 includes a deviation determining unit 221, an update instructing unit 222, a control rule updating and evaluating unit 223, and a result reflecting unit 224.

FIG. 8 is a diagram illustrating an example of a data structure of the threshold value storage unit. The threshold value storage unit 211 stores a facility ID column 211a, an index column 211b, a control change threshold value column 211c, and a plan change threshold value column 211d. The facility ID column 211a, the index column 211b, the control change threshold value column 211c, and the plan change threshold value column 211d are associated with one another. Further, these threshold values are information on threshold values to be used for deviation determination to be described later.

In the facility ID column 211a, information for specifying a facility ID that is identification information for uniquely identifying the production facility 410 or the production resource in the production area, and the conveyance facility or the conveyance resource in the production area is stored.

In the index column 211b, information for specifying an index that evaluates the suitability of an operation of a facility specified by the facility ID column 211a is stored. The plan compliance rate and the plan order matching rate described above are indices for the suitability of the operation.

In the control change threshold value column 211c, a threshold value for a predetermined index of each facility is stored. The threshold value is a threshold value for determining whether to change the control rule. Further, the facility is a facility specified by the facility ID column 211a, and the index is an index specified by the index column 211b.

In the plan change threshold value column 211d, a threshold value for a predetermined index of each facility is stored. The threshold value is a threshold value for determining whether to change the production plan. Further, the facility is a facility specified by the facility ID column 211a, and the index is an index specified by the index column 211b.

FIG. 9 is a diagram illustrating an example of a data structure of the production result storage unit. The production result storage unit 212 stores information acquired from the MES 310 to be described later. Specifically, the production result storage unit 212 stores a facility ID column 212a, a product ID column 212b, a quantity column 212c, a process ID column 212d, a start time column 212e, an end time column 212f, and an in-progress flag column 212g.

The facility ID column 212a, the product ID column 212b, the quantity column 212c, the process ID column 212d, the start time column 212e, the end time column 212f, and the in-progress flag column 212g are associated with one another.

In the facility ID column 212a, information for specifying a facility ID that is identification information for uniquely identifying the production facility 410 or the production resource in the production area, the conveyance facility 420 or the conveyance resource in the production area is stored.

In the product ID column 212b, a product ID for specifying a product is stored. The product ID is information for uniquely identifying a product such as an article or a component to be produced or conveyed by the production facility 410 or the conveyance facility 420 that is specified by the facility ID column 212a.

In the quantity column 212c, information for specifying the quantity of a product specified by the product ID column 212b is stored.

In the process ID column 212d, a process ID for specifying a process is stored. The process ID is information for uniquely identifying a process of processing a product specified by the product ID column 212b in the production facility 410 and the conveyance facility 420 that are specified by the facility ID column 212a.

In the start time column 212e, information for specifying a time when processing of a process specified by the process ID column 212d is started is stored. The process is a process that is performed in the production facility 410 specified by the facility ID column 212a for a product specified by the product ID column 212b.

In the end time column 212f, information for specifying a time when processing of a process specified by the process ID column 212d is completed is stored. When the processing is not completed, the column is blank. The process is a process that is performed in the production facility 410 specified by the facility ID column 212a for a product specified by the product ID column 212b.

In the in-progress flag column 212g, information for identifying whether processing of a process specified by the process ID column 212d is in progress or is completed is stored. The process is a process that is performed in the production facility 410 specified by the facility ID column 212a for a product specified by the product ID column 212b. For example, when the processing is completed, a value in the in-progress flag column 212g is "0", and when the processing is in progress, the value in the in-progress flag column 212g is "1".

FIG. 10 is a diagram illustrating an example of a data structure of the update history storage unit. The update history storage unit 213 stores a facility ID column 213a, a change instruction time column 213b, and a change type column 213c.

The facility ID column 213a, the change instruction time column 213b, and the change type column 213c are associated with one another.

In the facility ID column 213a, information for specifying a facility ID that is identification information for uniquely identifying the production facility 410 or the production resource in the production area, and the conveyance facility 420 or the conveyance resource in the production area is stored.

In the change instruction time column 213b, information for specifying a time when the update instructing unit 222 issues a change instruction to be described later to the production facility 410 or the conveyance facility 420 that is specified by the facility ID column 213a is stored.

In the change type column 213c, information for specifying a type of a change instruction issued according to the change instruction time column 213b to the production facility 410 or the conveyance facility 420 that is specified by the facility ID column 213a is stored. There are two types of change instruction, that is, "control" corresponding to a change of the control program, and "plan" corresponding to a change of the production plan.

The description returns to FIG. 1. The deviation determining unit 221 specifies a deviation between a predetermined production plan in a predetermined period and a production result related to the production plan, and determines necessity of update of a control rule of the production facility 410 or a production plan depending on a degree of the deviation. In this deviation specifying process, the deviation determining unit 221 executes a production simulation within a specified plan period with the progress of an execution time as a starting point. The deviation determining unit 221 calculates a deviation degree between a simulation result thereof and the production plan stored in the production plan storage unit 112.

Here, the deviation determining unit 221 uses, as the simulator, a discrete event type simulator that simulates operations of the control device 400, the production facilities 410, and the conveyance facility 420. For example, 1−the plan compliance rate can be set as an index representing the deviation degree. Here, the plan compliance rate=$\Sigma$_(all facilities) (the number of work procedures complying with a scheduled completion time in the production plan of one facility)/(the total number of work procedures of the facility). Alternatively, for example, 1−the plan order matching rate can be set as the index. Here, the plan order matching rate=$\Sigma$_(all facilities) (the number of work procedures matching with a work procedure order in the production plan of one facility)/(the total number of work procedures of the facility). In addition, 1−(the weighted sum of the plan compliance rate and the plan order matching rate) may be used as the index.

In addition, in the process of determining the necessity of update of the control rule of the production facility 410 or the production plan, the deviation determining unit 221 compares the control change threshold value column 211c and the plan change threshold value column 211d for each facility that are stored in the threshold value storage unit 211 with the deviation degree described above. Then, the deviation determining unit 221 determines that the update is necessary for a facility in which the deviation degree exceeds any one of the threshold values.

In a case where the update of the control rule or the production plan is necessary, depending on the degree of the deviation, the update instructing unit 222 instructs the predetermined control rule generating device 100, which determines the control rule of the production facility 410 with respect to the production plan, to update the control rule, or instructs the predetermined schedule generating device that generates the production plan to update the production plan.

In the process of determining the necessity of update of the control rule of the production facility 410 or the production plan, the update instructing unit 222 compares the control change threshold value column 211c and the plan change threshold value column 211d for each facility that are stored in the threshold value storage unit 211 with the deviation degree described above. Then, the update instructing unit 222 determines the update according to a threshold value that is exceeded by the deviation degree.

That is, when the deviation degree exceeds both the control change threshold value column 211c and the plan change threshold value column 211d, the update instructing unit 222 determines that the update of the production plan is necessary. Further, when the deviation degree exceeds the control change threshold value column 211c but is less than the plan change threshold value column 211d, the update instructing unit 222 determines that the update of the control rule is necessary.

When the update of the production plan is necessary, the update instructing unit 222 instructs the schedule generating device 300 to update the production plan, and when the update of the control rule is necessary, the update instructing unit 222 instructs the control rule generating device 100 to update the control rule.

The control rule updating and evaluating unit 223 updates a threshold value for determining the deviation degree. Specifically, the control rule updating and evaluating unit 223 resets the control change threshold value column 211c and the plan change threshold value column 211d by first giving priority to non-occurrence of the delay and then giving priority to non-occurrence of an excessive update as a next candidate. More specifically, the control rule updating and evaluating unit 223 performs the production simulation by using the production result for each state in which the threshold values of the control change threshold value column 211c and the plan change threshold value column 211d are varied for the time zone in which the update instruction is issued, and specifies the threshold value according to the priority standard described above.

The result reflecting unit 224 updates statistical values of the operation times of the processes in the production plan by using the production result. Specifically, an ST average and an ST variance are calculated based on statistics of the results of the operation times for the processes carried out in the facilities, and the ST distribution storage unit 113 is updated.

The input/output interface unit 230 receives input of various types of data. Specifically, the input/output interface unit 230 receives input of information stored in the threshold value storage unit 211 or the like from the user.

The communication unit 240 communicates with other devices via the network 50. The other devices include the control rule generating device 100, the schedule generating device 300, the MES 310, the control device 400, the production facilities 410 and the conveyance facility 420.

The result reflecting device 200 has a hardware configuration similar to that of the control rule generating device 100 described above. For example, the deviation determining unit 221, the update instructing unit 222, the control rule updating and evaluating unit 223, and the result reflecting unit 224 can be implemented by loading a program stored in the external storage device 903 into the memory 902 and executing the program by the processor 901, the input/output interface unit 230 can be implemented by the processor 901 using the input device 906, the output device 907, and the communication device 908, and the storage unit 210 can be implemented by the processor 901 using the memory 902 or the external storage device 903. The communication unit 240 can be implemented by the processor 901 using the communication device 908.

FIG. 11 is a diagram illustrating an example of a flowchart of a deviation determining process. The deviation determining process is started when a start instruction is received from a user or the like. Alternatively, the deviation determining process may be started at a predetermined date and time (for example, 6:00 a.m. every day) or at a predetermined interval (for example, every 12 hours).

First, the deviation determining unit 221 reads a production result (step S211). Specifically, the deviation determining unit 221 reads a production result stored in the production result storage unit 212.

Then, the deviation determining unit 221 executes a simulation within a specified plan period by setting the progress of an execution time as a starting point (step S212).

Then, the deviation determining unit 221 calculates, for a predetermined index, a deviation degree within the plan period for each facility by using a simulation result (step S213).

Then, the deviation determining unit 221 determines necessity of the update by comparing the deviation degree with the threshold value for each production facility 410 and each conveyance facility 420 stored in the threshold value storage unit 211 (step S214).

Then, the deviation determining unit 221 transmits a determination result to the update instructing unit 222. (step S215).

The flow of the deviation determining process has been described above. According to the deviation determining process, it is possible to determine whether the production result deviates from the production plan, and then to determine the deviation degree in a case where the deviation occurs.

FIG. 12 is a diagram illustrating an example of a flowchart of an update instructing process. The update instructing process is started after carrying out step S215 of the deviation determining process.

First, the update instructing unit 222 acquires the determination result of the deviation determining unit 221 (step S221). Then, the update instructing unit 222 determines whether the deviation degree calculated by the deviation determining unit 221 exceeds the control change threshold value column 211*c* (step S222). When the deviation degree does not exceed the control change threshold value column 211*c* ("No" in step S222), the update instructing unit 222 advances the control to step S227.

Then, when the deviation degree exceeds the control change threshold value column 211*c* ("Yes" in step S222), the update instructing unit 222 determines whether the deviation degree calculated by the deviation determining unit 221 exceeds the plan change threshold value column 211*d* (step S223). When the deviation degree does not exceed the plan change threshold value column 211*d* ("No" in step S223), the update instructing unit 222 advances the control to step S225.

Then, when the deviation degree exceeds the plan change threshold value column 211*d* ("Yes" in step S223), the update instructing unit 222 issues a rescheduling instruction to the schedule generating device 300 (step S224).

When the deviation degree does not exceed the plan change threshold value column 211*d* ("No" in step S223), the update instructing unit 222 issues an update instruction of the dispatching rule to the control rule generating device 100 (step S225).

Then, the control rule assigning unit 121 of the control rule generating device 100, which receives a request for updating the dispatching rule from the update instructing unit 222, executes a process (step S226). Specifically, the control rule assigning unit 121 reflects a production status (a process status including not-started, in-progress, and end) at the execution time, and assigns a dispatching rule to be applied to a related facility again with respect to a production plan for a predetermined period after the execution time. The same algorithm as that of step S113 of the control rule assigning process is applied to the assignment of the dispatching rule.

Then, the update instructing unit 222 stores an update history in the update history storage unit 213 (step S227).

The flow of the update instructing process has been described above. According to the update instructing process, it is possible to instruct the reassignment of the control rule according to the deviation degree of the production result from the production plan, or to instruct re-planning of the production plan in a case where the deviation degree is larger than a predetermined degree.

FIG. 13 is a diagram illustrating an example of a flowchart of a control rule updating and evaluating process. The control rule updating and evaluating process is started when a start instruction is received from a user or the like. Alternatively, the control rule updating and evaluating process may be started at a predetermined date and time (for example, 4:00 a.m. every day) or at a predetermined interval (for example, every 12 hours).

First, the control rule updating and evaluating unit 223 reads a production result of a predetermined facility in a predetermined period (step S231). Specifically, the control rule updating and evaluating unit 223 reads a production result stored in the production result storage unit 212 for the predetermined production facility 410 in a predetermined period.

Then, the control rule updating and evaluating unit 223 acquires an update history stored in the update history storage unit 213 for a control rule of the predetermined production facility 410 in the predetermined period (step S232).

Then, the control rule updating and evaluating unit 223 calculates a control change threshold value and a plan change threshold value for the predetermined production facility 410 and the conveyance facility 420. According to a calculation result, the control rule updating and evaluating unit 223 updates the control change threshold value column 211*c* and the plan change threshold value column 211*d* of the threshold value storage unit 211 (step S233).

Here, for example, the control rule updating and evaluating unit 223 changes the threshold values in a predetermined producing period unit such as a day, or a week, and compares the threshold values with the deviation degree. Then, the control rule updating and evaluating unit 223 may count the number of times of issuing the update instruction of the dispatching rule to the control rule generating device 100 and the number of times of issuing the rescheduling instruction to the schedule generating device 300, and may calculate a threshold value at which the number of times of the issuing becomes minimum while the plan compliance rate and the plan order matching rate satisfy predetermined standards.

An example of the flowchart of the control rule updating and evaluating process has been described above. According to the control rule updating and evaluating process, it is possible to automatically optimize the control change threshold value that is a trigger of a control change and a plan change threshold value that is a trigger of a production plan change of the facility.

FIG. 14 is a diagram illustrating an example of a flowchart of a result reflecting process. The result reflecting process is started when a start instruction is received from a user or the like. Alternatively, the result reflecting process may be started at a predetermined date and time (for example, 4:00 a.m. every day) or at a predetermined interval (for example, every 12 hours).

First, the result reflecting unit 224 reads a production result stored in the production result storage unit 212 for the predetermined production facility 410 in a predetermined period (step S241).

Then, the result reflecting unit 224 calculates, for the predetermined production facility 410, a statistical value (for example, an ST average, an ST variance) of an operation time for each process (step S242).

Then, the result reflecting unit 224 stores the calculated statistical value in the ST distribution storage unit 113 of the control rule generating device 100 for each process of the production facility 410 (step S243).

Then, the result reflecting unit 224 reflects the statistical value in a master value of the simulator of the control rule generating device 100 (step S244).

An example of a flowchart of the result reflecting process has been described above. According to the result reflecting process, it is possible to automatically set the statistical value, which is used as the basis in the simulation of the facility, according to an actual state.

The schedule generating device 300 is a device that creates, for a factory, a production system, a production process, and a production site for which a production plan is to be generated, a production plan (a production schedule) in a processing unit for each production facility 410. For example, similarly to a schedule generating device used in an existing technique, the schedule generating device 300 creates a future production plan by using master information including a process flow for each product type, a standard operation time of each process, production facility information used in each process, a production facility list and a maintenance plan in a factory, a list of facilities assigned to an operator, a shift plan of the operator, an operation calendar in the factory, and the like, in-progress product information at a planned date and time, and information such as a factory input plan, and displays the future production plan as a Gantt chart.

Further, the control rule generating device 100 may receive production plan data and the like from the MES 310 connected to the network, instead of the schedule generating device 300. The MES 310 collects or manages production result information, collects or manages facility information, and collects or manages operator information. In addition, the MES 310 transmits the production result information, the facility information, and the operator information to the control rule generating device 100 and the result reflecting device 200 in response to requests from the control rule generating device 100 and the result reflecting device 200.

The control device 400 controls, by a control program, the production facilities 410 and the conveyance facility 420 to be controlled. The control device 400 receives a control program from an operator or a host system.

FIG. 15 is a diagram illustrating an example of a control rule generation result screen. A control rule generation result screen 600 is an example of a screen that receives an input of facility ID for specifying the production facility 410 or the conveyance facility 420, and displays the production plan and a control plan for the facility. An input area 610 is an area for selectively receiving the facility ID for identifying the production facility 410 or the conveyance facility 420 to be displayed. A current time is displayed in a date and time display area 620. In a summary display area 630, a plan value of a predetermined index such as the plan compliance rate or the plan order matching rate, and a current value calculated immediately are displayed. In a production plan display area 640, for the facility ID input in the input area 610, the production plan stored in the production plan storage unit 112 is displayed by a Gantt chart. In a control plan display area 650, for the facility ID input in the input area 610, a control plan including the dispatching rule (displayed as an employed rule for each time zone in the figure) generated by the control rule generating device 100 is displayed. An example of the control rule generation result screen has been described above.

A configuration example of the control rule generating system according to an embodiment of the invention has been described above. According to the control rule generating system 10, it is possible to ensure the robustness to the production variation.

The invention is not limited to the above embodiments, and includes various modifications. For example, the above embodiments have been described in detail for easy understanding of the invention, and are not necessarily limited to those including all the configurations described above. It is possible to replace a part of a configuration according to an embodiment with another configuration, and it is also possible to add a configuration according to an embodiment to a configuration according to another embodiment. It is also possible to delete a part of a configuration of an embodiment.

Parts, configurations, functions, processing units, and the like described above may be partially or entirely implemented with hardware, for example, by designing integrated circuits. In addition, the parts, the configurations, the functions and the like described above may be implemented by software by interpreting and executing programs that implement respective functions by a processor. Information such as a program, a table, and a file for implementing each function can be stored in a recording device such as a memory, a hard disk, or in a recording medium such as an IC card, an SD card, and a DVD.

Control lines and information lines according to the embodiments described above indicate what is considered necessary for the description, and not all of the control lines and the information lines are necessarily shown in an article. In practice, it may be considered that almost all of the configurations are connected to each other. As described above, the invention has been described focusing on the embodiments.

REFERENCE SIGNS LIST

10: control rule generating system
50: network
100: control rule generating device
110: storage unit
111: rule storage unit
112: production plan storage unit
113: ST distribution storage unit 114: assignment storage unit
120: processing unit
121: control rule assigning unit
130: input/output interface unit
140: communication unit
200: result reflecting device
210: storage unit
211: threshold value storage unit
212: production result storage unit
213: update history storage unit
220: processing unit
221: deviation determining unit
222: update instructing unit
223: control rule updating and evaluating unit
224: result reflecting unit
230: input/output interface unit
240: communication unit
300: schedule generating device
310: MES
400: control device
410: production facilities
420: conveyance facility
The invention claimed is:

1. A control rule generating device for generating a control rule of a production facility including at least a production device, the control rule generating device comprising:
a rule storage unit configured to store candidates of a dispatching rule serving as the control rule usable for each of the production facility and a control program for implementing the dispatching rule; and
a control rule assigning unit configured to specify, for each of the production facility, the dispatching rule corresponding to a production plan among the candidates of the dispatching rule as the dispatching rule to be applied, and transmit the control program corresponding to the specified dispatching rule to the production facility;
wherein, in a process of specifying the dispatching rule, the control rule assigning unit estimates an operation time of a production process included in the production plan by using a statistical error, and specifies the dispatching rule by using a compliance rate of the production plan; and
wherein operations of the production facility, including a plurality of machining operations on a product produced by the production facility, are controlled based on the control program.

2. A control rule generating device for generating a control rule of a production facility including at least a production device, the control rule generating device comprising:
a rule storage unit configured to store candidates of a dispatching rule serving as the control rule usable for each of the production facility and a control program for implementing the dispatching rule; and
a control rule assigning unit configured to specify, for each of the production facility, the dispatching rule corresponding to a production plan among the candidates of the dispatching rule as the dispatching rule to be applied, and transmit the control program corresponding to the specified dispatching rule to the production facility;
wherein, in a process of specifying the dispatching rule, the control rule assigning unit performs a simulation to which the dispatching rule is applied for each time zone, and specifies the dispatching rule by using a compliance rate of the production plan; and
wherein operations of the production facility, including a plurality of machining operations on a product produced by the production facility, are controlled based on the control program.

3. A control rule generating device for generating a control rule of a production facility including at least a production device, the control rule generating device comprising:
a rule storage unit configured to store candidates of a dispatching rule serving as the control rule usable for each of the production facility and a control program for implementing the dispatching rule;
a control rule assigning unit configured to specify, for each of the production facility, the dispatching rule corresponding to a production plan among the candidates of the dispatching rule as the dispatching rule to be applied, and transmit the control program corresponding to the specified dispatching rule to the production facility; and
a communication unit configured to communicate with a result reflecting device that includes:
a deviation determining unit configured to specify a deviation between the production plan in a predetermined period and a production result related to the production plan, and determine necessity of update of the control rule of a production facility or the production plan depending on a degree of the deviation; and
an update instructing unit configured to, in a case where the update of the control rule of the production facility or the production plan is necessary, depending on the degree of the deviation, instruct the control rule generating device to update the control rule, or instruct a predetermined schedule generating device, that generates the production plan, to update the production plan;
wherein operations of the production facility, including a plurality of machining operations on a product produced by the production facility, are controlled based on the control program.

4. The control rule generating device according to claim 3, wherein the result reflecting device further includes a control rule updating and evaluating unit configured to update a threshold value, for determining the degree of the deviation, by giving priority to non-occurrence of a delay.

5. The control rule generating device according to claim 3, wherein the result reflecting device further includes a result reflecting unit configured to update a statistical value of an operation time of a process in the production plan by using the production result.

* * * * *